US012073776B2

(12) United States Patent
Hong et al.

(10) Patent No.: US 12,073,776 B2
(45) Date of Patent: Aug. 27, 2024

(54) AFTERIMAGE COMPENSATOR, DISPLAY DEVICE INCLUDING THE SAME, AND METHOD OF COMPENSATING FOR IMAGE DATA OF DISPLAY DEVICE

(71) Applicant: Samsung Display Co., LTD., Yongin-si (KR)

(72) Inventors: Seok Ha Hong, Yongin-si (KR); Joon Chul Goh, Yongin-si (KR); Dong Joon Kwag, Yongin-si (KR); Jae Sung Bae, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/955,327

(22) Filed: Sep. 28, 2022

(65) Prior Publication Data

US 2023/0104466 A1 Apr. 6, 2023

(30) Foreign Application Priority Data

Oct. 5, 2021 (KR) ........................ 10-2021-0131951

(51) Int. Cl.
*G09G 3/32* (2016.01)

(52) U.S. Cl.
CPC ....... *G09G 3/32* (2013.01); *G09G 2300/0819* (2013.01); *G09G 2300/0842* (2013.01); *G09G 2320/0233* (2013.01); *G09G 2320/0257* (2013.01); *G09G 2320/045* (2013.01);
(Continued)

(58) Field of Classification Search
CPC ............ G09G 3/32; G09G 2300/0819; G09G 2300/0842; G09G 2320/0233; G09G 2320/0257; G09G 2320/045; G09G 2320/048; G09G 2360/147;
(Continued)

(56) References Cited

U.S. PATENT DOCUMENTS

| | | | |
|---|---|---|---|
| 10,839,729 | B2 | 11/2020 | Yoo et al. |
| 2009/0284450 | A1 | 11/2009 | Ishige et al. |
| 2019/0333452 | A1 | 10/2019 | Kim et al. |

(Continued)

FOREIGN PATENT DOCUMENTS

| | | | |
|---|---|---|---|
| JP | 2009-276671 | A | 11/2009 |
| KR | 10-1720345 | B1 | 3/2017 |

(Continued)

*Primary Examiner* — Amare Mengistu
*Assistant Examiner* — Gloryvid Figueroa-Gibson
(74) *Attorney, Agent, or Firm* — Lewis Roca Rothgerber Christie LLP

(57) ABSTRACT

An afterimage compensator includes: a pixel data generator configured to generate characteristic data for one or more pixels from among a plurality of pixels by using a captured image; a stress accumulator configured to generate an accumulated stress for the one or more pixels in which stress corresponding to the one or more pixels is accumulated based on an image signal of a voltage domain; a domain converter configured to convert the accumulated stress for the one or more pixels from the voltage domain to accumulated stress data for the one or more pixels of a grayscale domain; and a compensator configured to generate compensation data using the characteristic data for the one or more pixels and the accumulated stress data for the one or more pixels.

20 Claims, 16 Drawing Sheets

(52) U.S. Cl.
CPC ................ *G09G 2320/048* (2013.01); *G09G 2360/147* (2013.01); *G09G 2360/16* (2013.01)

(58) Field of Classification Search
CPC ....... G09G 2360/16; G09G 2320/0295; G09G 2360/145; G09G 5/36; G09G 2320/043; G09G 2320/0626
USPC .......................................................... 345/694
See application file for complete search history.

(56) References Cited

U.S. PATENT DOCUMENTS

| | | | | |
|---|---|---|---|---|
| 2021/0304673 | A1* | 9/2021 | Gao ..................... | G09G 3/3233 |
| 2022/0122540 | A1* | 4/2022 | Choi .................... | G09G 3/3233 |

FOREIGN PATENT DOCUMENTS

| | | | |
|---|---|---|---|
| KR | 10-2019-0125551 | A | 11/2019 |
| KR | 10-2020-0001658 | A | 1/2020 |

* cited by examiner

AFTERIMAGE COMPENSATOR, DISPLAY DEVICE INCLUDING THE SAME, AND METHOD OF COMPENSATING FOR IMAGE DATA OF DISPLAY DEVICE

CROSS-REFERENCE TO RELATED APPLICATION

The present application claims priority to and the benefit of Korean Patent Application No. 10-2021-0131951, filed on Oct. 5, 2021, the entire disclosure of which is incorporated herein by reference.

BACKGROUND

1. Field

Aspects of some embodiments of the present disclosure relate to an afterimage compensator, a display device including the same, and a method of compensating for image data of the display device.

2. Discussion of the Related Art

In a display device (especially, a light emitting display device), a luminance deviation and an afterimage may occur between pixels due to deterioration of the pixel or a light emitting element over time. Therefore, techniques to compensate or adjust image data may be utilized to increase display quality.

Because the light emitting element may use a self-luminous material, the light emitting element may have a characteristic in which deterioration of the material itself occurs and a luminance decreases over time.

The display device may accumulate aging characteristics (for example, stress or a deterioration degree) for each pixel to compensate for the deterioration and the afterimage, and compensates for the stress based thereon. For example, the stress may be accumulated based on a current flowing through each of the pixels for each frame, a light emission time, and the like.

The above information disclosed in this Background section is only for enhancement of understanding of the background and therefore the information discussed in this Background section does not necessarily constitute prior art.

SUMMARY

Aspects of some embodiments of the present disclosure include an afterimage compensator in which deterioration distribution information for each pixel is reflected, a display device including the afterimage compensator, and a method of compensating for image data of the display device.

According to some embodiments of the present disclosure, an afterimage compensator includes a pixel data generator configured to generate characteristic data for each pixel corresponding to each of the pixels by using a captured image, a stress accumulator configured to generate an accumulated stress for each pixel in which stress corresponding to each of the pixels is accumulated based on an image signal of a voltage domain, a domain converter configured to convert the accumulated stress for each pixel from the voltage domain to accumulated stress data for each pixel of a grayscale domain, and a compensator configured to generate compensation data using the characteristic data for each pixel and the accumulated stress data for each pixel.

According to some embodiments, the characteristic data for each pixel may include current density data corresponding to each of the pixels.

According to some embodiments, the captured image may include information on the number of light emitting elements for each of the pixels.

According to some embodiments, the pixel data generator may process the captured image to generate captured image data, calculate an emission area of each of the pixels by reflecting a luminance weight in the captured image data, and calculate the current density data corresponding to each of the pixels.

According to some embodiments, the domain converter may provide the accumulated stress data for each pixel corresponding to the grayscale domain to the compensator.

According to some embodiments, a display device includes a display panel including pixels, and an afterimage compensator configured to generate characteristic data for each pixel corresponding to each of the pixels based on a captured image, generate an accumulated stress for each pixel corresponding to each of the pixels by accumulating an image signal of a voltage domain, convert the accumulated stress for each pixel to accumulated stress data for each pixel of a grayscale domain, and output compensation data based on the characteristic data for each pixel and the accumulated stress data for each pixel.

According to some embodiments, the characteristic data for each pixel may include current density data corresponding to each of the pixels.

According to some embodiments, the captured image may include information on the number of light emitting elements for each of the pixels.

According to some embodiments, the afterimage compensator may process the captured image to generate captured image data, calculate an emission area of each of the pixels by reflecting a luminance weight in the captured image data, and calculate the current density data corresponding to each of the pixels.

According to some embodiments, the display device may further include a first memory configured to store the characteristic data for each pixel.

According to some embodiments, the display device may further include a second memory configured to store the accumulated stress for each pixel.

According to some embodiments, the display device may further include a scan driver configured to provide a scan signal to the pixels.

According to some embodiments, the display device may further include a data driver configured to provide a data signal to which the compensation data is applied to the pixels.

According to some embodiments, the display device may further include a timing controller configured to provide the image data to the afterimage compensator.

According to some embodiments, each of the pixels may include light emitting elements of a column shape.

According to some embodiments, a method of compensating for image data of a display device includes generating characteristic data for each pixel corresponding to each of the pixels by using a captured image, generating a stress corresponding to each of the pixels based on an image signal of a voltage domain, and generating an accumulated stress for each pixel by accumulating the stress, converting the accumulated stress for each pixel to accumulated stress data for each pixel of a grayscale domain, and generating compensation data using the characteristic data for each pixel and the accumulated stress data for each pixel.

According to some embodiments, the characteristic data for each pixel may include current density data corresponding to each of the pixels.

According to some embodiments, the captured image may include information on the number of light emitting elements for each of the pixels.

According to some embodiments, captured image data may be generated by processing the captured image, an emission area of each of the pixels may be calculated by reflecting a luminance weight in the captured image data, and the characteristic data for each pixel may be generated by calculating the current density data corresponding to each of the pixels.

According to some embodiments, Compensation image data may be generated by applying the compensation data to image data, and a data signal corresponding to the compensation image data may be provided to the pixels.

A display device according to some embodiments may generate the characteristic data for each pixel and the accumulated stress data for each pixel corresponding to each of the pixels, and may perform afterimage compensation reflecting deterioration distribution information for each pixel, by using the characteristic data for each pixel and the accumulated stress data for each pixel.

Characteristics and features of embodiments according to the present disclosure are not limited to the characteristics described above, and further details of some embodiments according to the present disclosure are described below.

BRIEF DESCRIPTION OF THE DRAWINGS

The above and other features and characteristics of some embodiments the present disclosure will become more apparent by describing in further detail aspects of some embodiments thereof with reference to the accompanying drawings, in which.

DETAILED DESCRIPTION

Figure 1:
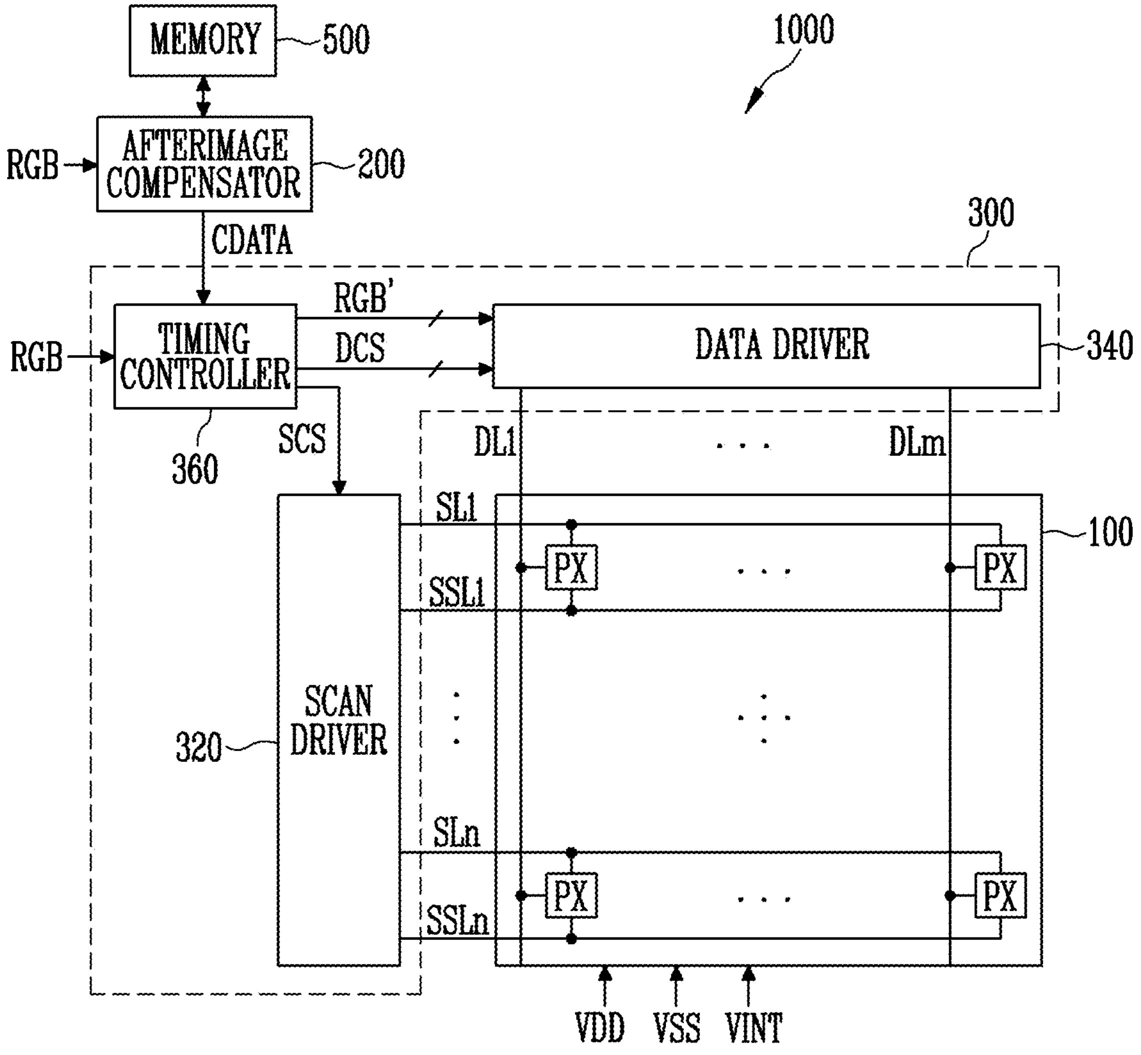
FIG. 1 is a block diagram illustrating a display device according to some embodiments.

Embodiments according to the present disclosure may be variously modified and have various forms. Therefore, aspects of some embodiments will be illustrated in the drawings and will be described in more detail in the specification. However, it should be understood that the disclosure is not intended to be limited to the disclosed specific forms, and the disclosure includes all modifications, equivalents, and substitutions within the spirit and technical scope of the disclosure.

Terms of "first", "second", and the like may be used to describe various components, but the components should not be limited by the terms. The terms are used only for the purpose of distinguishing one component from another component. For example, without departing from the scope of the disclosure, a first component may be referred to as a second component, and similarly, a second component may also be referred to as a first component. The singular expressions include plural expressions unless the context clearly indicates otherwise.

It should be understood that in the present application, a term of "include", "have", or the like is used to specify that there is a feature, a number, a step, an operation, a component, a part, or a combination thereof described in the specification, but does not exclude a possibility of the presence or addition of one or more other features, numbers, steps, operations, components, parts, or combinations thereof in advance. In addition, a case where a portion of a layer, a film, an area, a plate, or the like is referred to as being "on" another portion, it includes not only a case where the portion is "directly on" another portion, but also a case where there is further another portion between the portion and the other portion. In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and the other portion.

Hereinafter, a display device according to some embodiments of the present disclosure is described with reference to the drawings related to the embodiments of the present disclosure.

FIG. 1 is a block diagram illustrating a display device according to some embodiments.

Referring to FIG. 1, the display device 1000 may include a display panel 100, an afterimage compensator 200, and a panel driver 300.

The display device 1000 may include a flexible display device, a rollable display device, a curved display device, a transparent display device, a mirror display device, and the like implemented as an organic light emitting display device, an inorganic light emitting display device, and/or the like.

The display panel 100 may include a plurality of pixels PX and may display an image. For example, the display panel 100 may include the pixels PX arranged to be connected to a plurality of scan lines SL1 to SLn, a plurality of sensing control lines SSL1 to SSLn, and a plurality of data lines DL1 to DLm. According to some embodiments, each of the pixels PX may emit one color of light from among red, green, and blue. However, this is an example, and each of the pixels PX may emit a color of light that is cyan, magenta, yellow, or the like.

The afterimage compensator 200 may generate characteristic data for each pixel based on a captured image, accumulate image data RGB to generate accumulated stress data for each pixel, and output compensation data CDATA based on the characteristic data for each pixel and the accumulated stress data for each pixel. Stress data may include information on an emission time, a grayscale, a luminance, a temperature, and the like of the pixels PX. The stress data may be a value calculated in response to each of the pixels PX. According to some embodiments, stress data may be a value calculated in response to each of a pixel group, a pixel block, or the like divided by a criterion (e.g., a set or predetermined criterion).

According to some embodiments, the afterimage compensator 200 may include a pixel data generator that generates the characteristic data for each pixel corresponding to each of the pixels PX, a stress accumulator that generates the accumulated stress data for each pixel (or an accumulated stress for each pixel) in which stress data (or a stress) corresponding to each of the pixels PX is accumulated, and a compensator that generates the compensation data CDATA by using the characteristic data for each pixel and the accumulated stress data for each pixel.

According to some embodiments, the afterimage compensator 200 may be implemented as an independent application processor (AP). According to some embodiments, at least some configurations or all configurations of the afterimage compensator 200 may be included in a timing controller 360. According to some embodiments, the afterimage compensator 200 may be included in an integrated circuit (IC) including a data driver 340.

According to some embodiments, the panel driver 300 may include a scan driver 320, the data driver 340, and the timing controller 360.

The scan driver 320 may provide a scan signal to the pixels PX of the display panel 100 through scan lines SL1 to SLn. The scan driver 320 may provide the scan signal to the display panel 100 based on a scan control signal SCS received from the timing controller 360.

The data driver 340 may provide a data signal to which the compensation data CDATA is applied to the pixels PX of the display panel 100 through data lines DL1 to DLm. The data driver 340 may provide the data signal (or a data voltage) to the display panel 100 based on a data driving control signal DCS received from the timing controller 360. According to some embodiments, the data driver 340 may convert compensation image data RGB' to which the compensation data CDATA is applied to an analog data signal (or data voltage).

The timing controller 360 may receive image data RGB from an external graphic source or the like, and may control driving of the scan driver 320 and the data driver 340. The timing controller 360 may generate the scan control signal SCS and the data driving control signal DCS. According to some embodiments, the timing controller 360 may generate the compensation image data RGB' by applying the compensation data CDATA to the image data RGB. The compensation image data RGB' may be provided to the data driver 340.

According to some embodiments, the timing controller 360 may further control driving of the afterimage compensator 200. For example, the timing controller 360 may provide the image data RGB of each frame to the afterimage compensator 200.

According to some embodiments, the panel driver 300 may further include a power supply that generates a first driving voltage VDD, a second driving voltage VSS, and an initialization voltage VINT for driving the display panel 100.

Hereinafter, an afterimage compensator according to some embodiments is described in more detail with reference to FIGS. 2 and 3.

Figure 2:
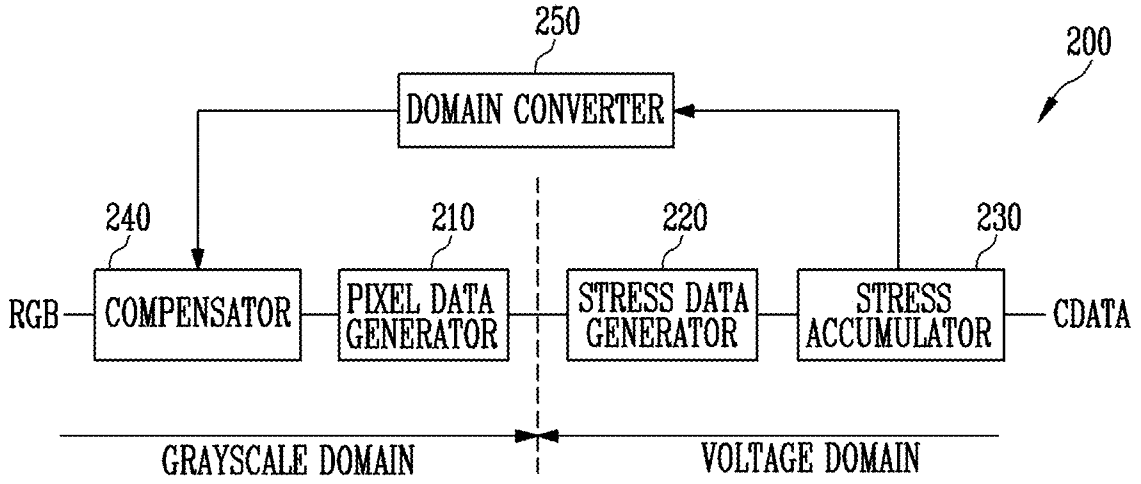
FIG. 2 is a diagram sequentially illustrating a part configuring an afterimage compensator according to some embodiments.
Figure 3:
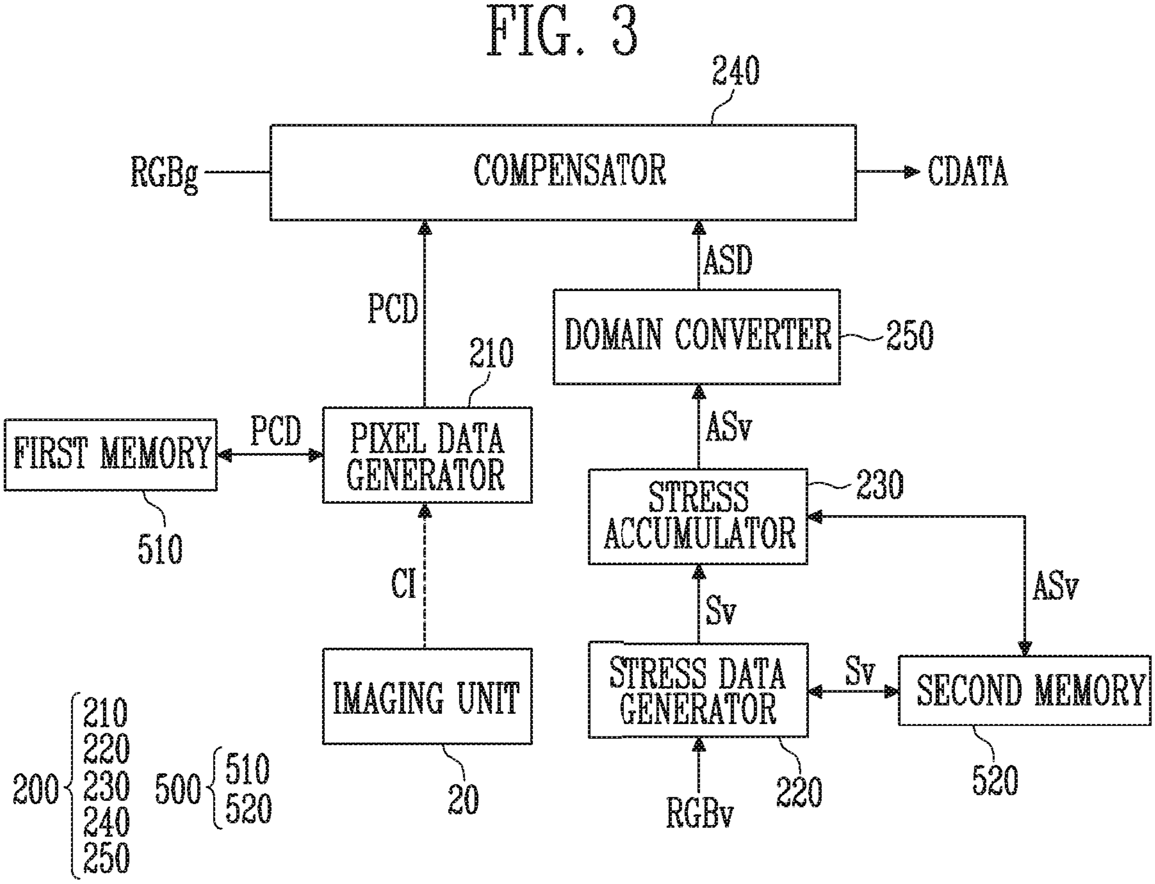
FIG. 3 is a block diagram illustrating an afterimage compensator according to some embodiments.

FIG. 2 is a diagram sequentially illustrating a part configuring an afterimage compensator according to some embodiments, and FIG. 3 is a block diagram illustrating an afterimage compensator according to some embodiments.

Referring to FIGS. 2 and 3, the afterimage compensator 200 may include a pixel data generator 210, a stress data generator 220, a stress accumulator 230, a compensator 240, and a domain converter 250.

The pixel data generator 210 may generate characteristic data for each pixel PCD corresponding to each of the pixels PX (or sub-pixels), by using a captured image CI received from an imaging unit 20. The characteristic data for each pixel PCD may include current density data for each pixel PX.

During a manufacturing process of the display device, a luminance deviation may be compensated while a process of measuring a luminance of the display device and a process of adjusting a voltage applied to the display device (or a process of adjusting an offset or a compensation value for a light emitting characteristic of each of the pixels) are repeated several times. A process of compensating for the luminance deviation may be referred to as optical compensation, and according to some embodiments, the characteristic data for each pixel PCD generated by the pixel data generator 210 may be considered as data on which the optical compensation is performed.

According to some embodiments, each of the pixels PX may include a different number of light emitting elements. When the same driving current is applied to the pixels PX, current densities of each of the pixels PX may be different from each other. Current density information for each pixel PX may be similar to deterioration distribution information for each pixel. Thus, according to some embodiments, the deterioration distribution information for each pixel may be obtained through the characteristic data for each pixel PCD. Driving of the pixel data generator 210 is described in detail with reference to FIGS. 4 to 8, which will be described in more detail later.

An image signal RGBv of a voltage domain obtained by converting image data RGBg of a grayscale domain may be applied to the stress data generator 220. For example, the image data RGBg of the grayscale domain may be converted to the image signal RGBv of the voltage domain through a gamma corrector.

The stress data generator 220 may generate a stress Sv corresponding to each of the pixels PX based on the image signal RGBv of the voltage domain.

The stress accumulator 230 may generate an accumulated stress for each pixel ASv by accumulating the stress Sv, and may provide the accumulated stress for each pixel ASv to the domain converter 250.

Because the stress data generator 220 and the stress accumulator 230 may generate the stress Sv and accumulate the stress Sv before the compensation data voltage is output, the accumulated stress for each pixel ASv may be accurately reflected.

The domain converter 250 may convert the accumulated stress for each pixel ASv corresponding to the voltage domain to the grayscale domain, and provide accumulated stress data for each pixel ASD corresponding to the grayscale domain to the compensator 240.

The compensator 240 may generate the compensation data CDATA by compensating for the image data RGB or RGBg using the characteristic data for each pixel PCD and the accumulated stress data for each pixel ASD. At this time, the image data RGB or RGBg, the characteristic data for each pixel PCD, and the accumulated stress data for each pixel ASD may correspond to the grayscale domain, and the stress Sv and the accumulated stress for each pixel ASv may correspond to the voltage domain.

Because the characteristic data for each pixel PCD may include the current density (or luminance information) for each pixel PX, and the accumulated stress data for each pixel ASD may include the deterioration information for each of the pixels PX, the compensator 240 may generate the compensation data CDATA by applying the luminance information and the degradation information corresponding to each of the pixels PX. Thus, the afterimage compensation of the display panel 100 (refer to FIG. 1) may be efficiently performed.

The compensator 240 may provide the compensation data CDATA to the timing controller 360 (refer to FIG. 1), and the timing controller 360 may apply the compensation data CDATA to the image data RGB to generate the compensation image data RGB'.

A memory 500 may include a first memory 510 for storing the characteristic data for each pixel PCD, and a second memory 520 for storing stress for each pixel Sv and the accumulated stress for each pixel ASv.

The pixel data generator 210 may store the characteristic data for each pixel PCD in the first memory 510, and the compensator 240 may directly read the characteristic data for each pixel PCD from the first memory 510.

The stress data generator 220 may store the stress for each pixel Sv in the second memory 520, and the stress accumulator 230 may store the accumulated stress for each pixel ASv in the second memory 520. The compensator 240 may directly read the accumulated stress for each pixel ASv from the second memory 520.

The afterimage compensator 200 according to some embodiments may generate the characteristic data for each pixel PCD and the accumulated stress data for each pixel ASD corresponding to each of the pixels PX, and may determine a deterioration amount of each of the pixels by using the characteristic data for each pixel PCD and the accumulated stress data for each pixel ASD.

Hereinafter, a characteristic of a pixel characteristic generator according to some embodiments is described in more detail with reference to FIGS. 4 to 8C.

Figure 4:
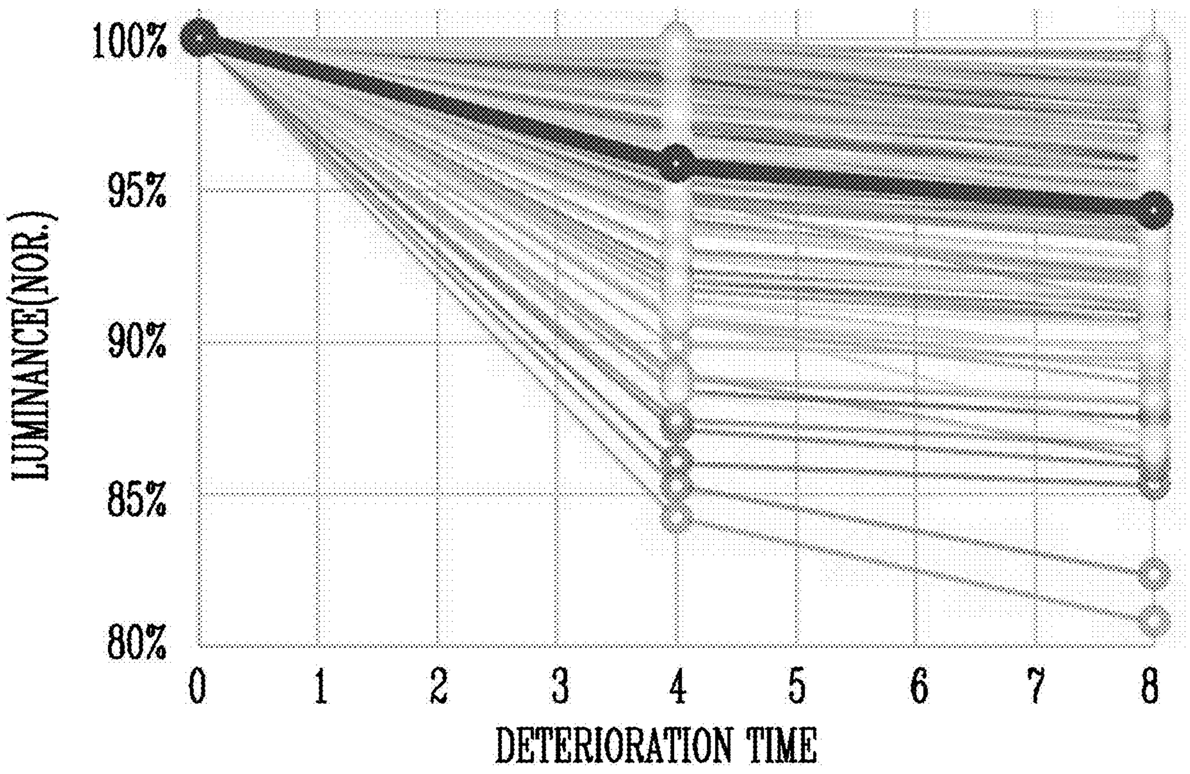
FIG. 4 is a graph illustrating a luminance relationship of a display panel according to time according to some embodiments.
Figure 5:
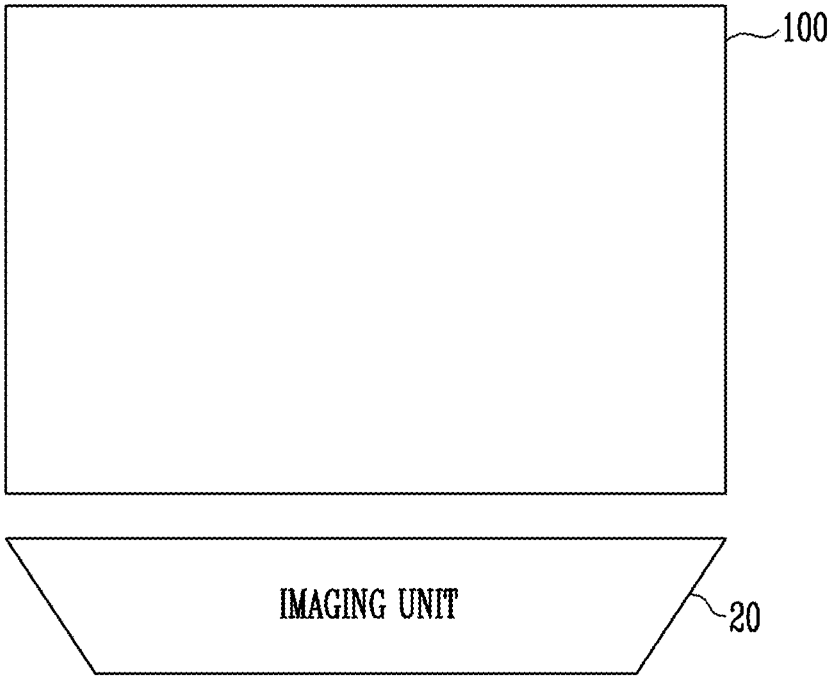
FIG. 5 is a diagram illustrating an imaging of a display panel according to some embodiments.
Figure 6:
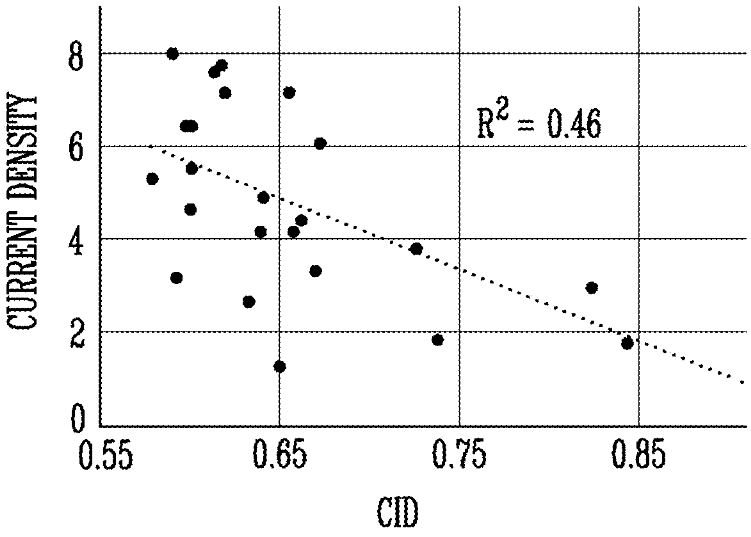
FIG. 6 is a graph illustrating a current density relationship according to captured image data according to some embodiments.
Figure 7:
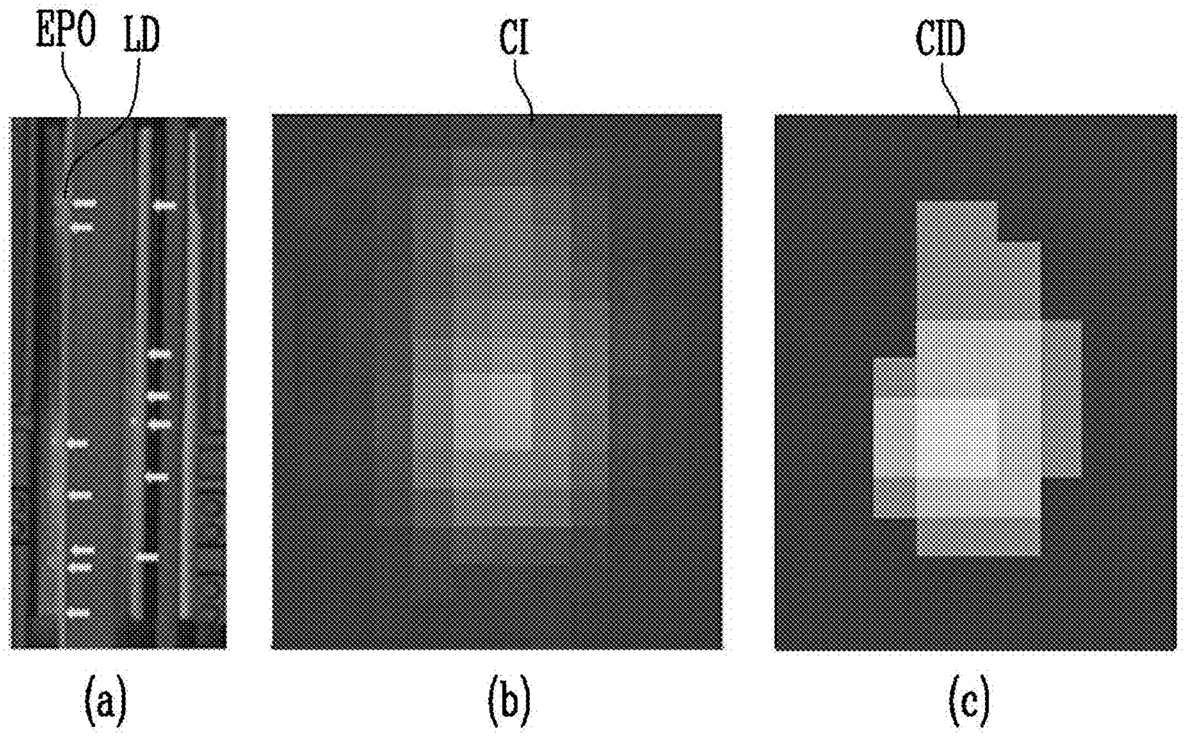
FIG. 7 is images illustrating driving of a pixel data generator according to some embodiments.
Figure 8A:
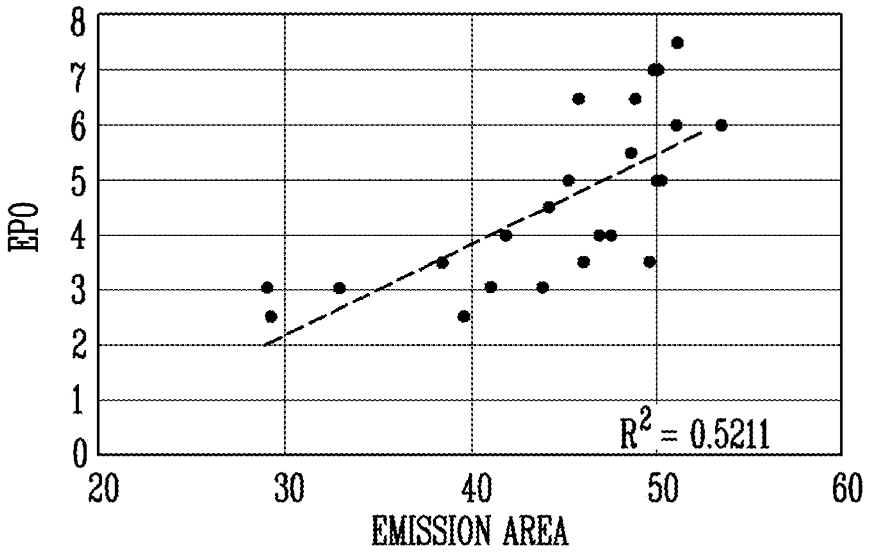
FIGS. 8A, 8B, and 8C are graphs illustrating a relationship between an emission area and a current density according to some embodiments.
Figure 8B:
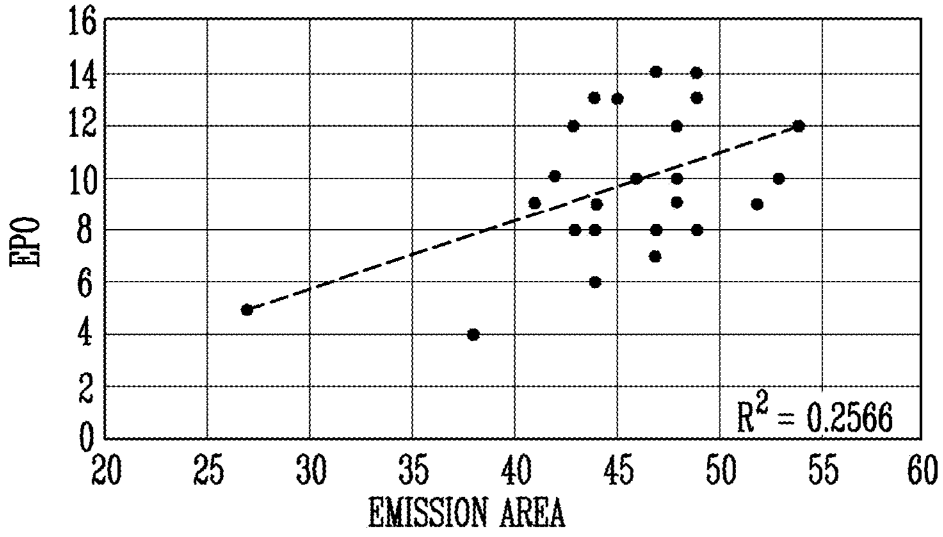
Figure 8C:
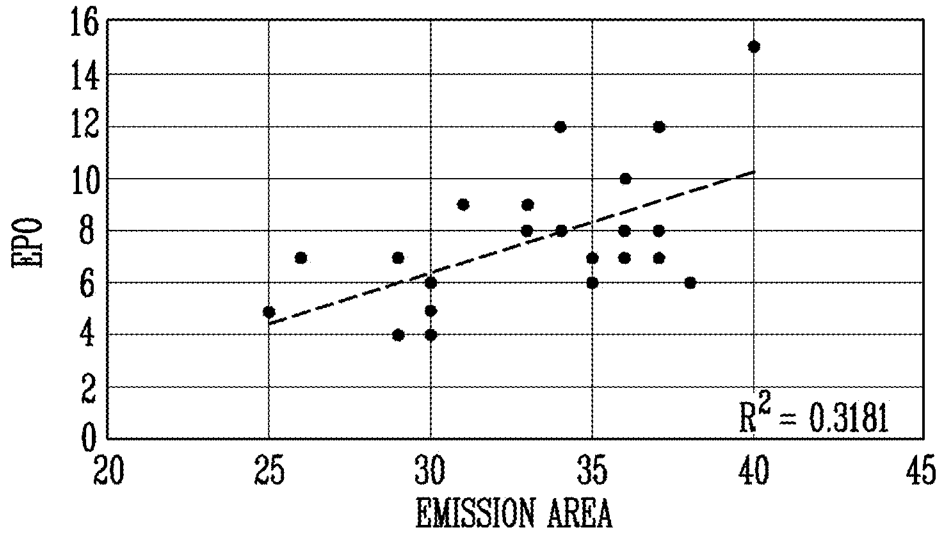

FIG. 4 is a graph illustrating a luminance relationship of a display panel according to time, FIG. 5 is a diagram illustrating an imaging of a display panel according to some embodiments, FIG. 6 is a graph illustrating a current density relationship according to captured image data, FIG. 7 is images illustrating driving of a pixel data generator according to some embodiments, and FIGS. 8A, 8B, and 8C are graphs illustrating a relationship between an emission area and a current density.

Referring to FIG. 4, a luminance change according to deterioration time of the display panel may be checked. In general, because the light emitting element of the display device deteriorates over time, a luminance of the display panel may decrease. Because each of the pixels of the display panel includes a different number of light emitting elements, a luminance decrease degree over time may be different for each pixel. That is, afterimage compensation of the display device is required to be performed by reflecting deterioration distribution information for each pixel.

According to some embodiments, because the characteristic data for each pixel PCD (refer to FIGS. 2 and 3) includes the deterioration distribution information for each pixel, the afterimage compensation of the display device may be performed by reflecting the deterioration distribution information for each pixel.

Referring to FIGS. 5 and 3 together, the imaging unit 20 may generate the captured image CI by imaging the display panel 100. For example, in a manufacturing process of the display device, before product shipment, the imaging unit 20 may capture an image displayed on the display panel 100 to generate the captured image CI, and provide the captured image CI to the pixel data generator 210. The captured image CI may include information on the number of light emitting elements for each pixel PX. Here, the imaging unit 20 may be implemented as an external thermal imaging camera, a charge-coupled device (CCD) camera, or the like.

Referring to FIGS. 6 and 3 together, in one pixel, a change of the current density according to captured image data CID may be checked. The current density of each pixel and the captured image data CID may have a linear relationship. For example, the current density according to the captured image data CID may correspond to a proportional relationship. Accordingly, the current density information may be obtained using the captured image data CID. Here, the captured image data CID may be data generated by processing the captured image CI, which is obtained through the imaging unit 20, by the pixel data generator 210. The captured image data CID is described in more detail with reference to FIGS. 7 and 8A to 8C, which will be described later.

For example, the pixel data generator 210 may calculate the emission area by reflecting the luminance weight according to the captured image data CID, and predict the current density data of each pixel PX. Accordingly, the characteristic data for each pixel PCD may include the current density data for each of the pixels PX.

Referring to FIG. 7, (a) shows a plan view of a portion corresponding to an opening EPO of one pixel. Here, the number of light emitting elements LD of one pixel may be 13. (b) shows the captured image CI obtained by capturing a portion shown in (a) through the imaging unit 20, and (c) shows the captured image data CID generated by processing a portion shown in (b).

The pixel data generator 210 may process an image of (b) to generate the captured image data CID shown in (c). The captured image data CID shown in (c) may be processed to be clearer than the captured image CI of (b), and thus the emission area of the pixel may be easily identified.

The pixel data generator 210 may identify the emission area of one pixel from the captured image data CID shown in (c), and calculate the current density data by applying a luminance weight according to the emission area of the captured image CI. For example, the pixel data generator 210 may apply the luminance weight to the captured image data CID with reference to Equation 1, Equation 2, and Table 1 below. Equation 1

$$B = \text{if (luminance of } CID \text{ emission area} > TH) = 1 \text{ else, } 0$$

(B is a constant for applying the emission area of the CID, TH is a minimum threshold value for applying a luminance value for each portion according to a preset position)

$$\sum_{k=0}^{m\times n} WF_k \times B_k \quad \text{Equation 2}$$

(Here, m×n is the number of pixels of an imaging camera corresponding to the pixel area to be imaged, WF is the luminance weight, and B is a value of Equation 1)

TABLE 1

| CID portion | Luminance value for each CID portion | Luminance weight (WF) |
|---|---|---|
| First portion | <TH1 | 0.5 |
| Second portion | >TH1 & <TH2 | 1 |
| Third portion | >TH2 & <TH3 | 1.5 |
| Fourth portion | >TH3 | 2 |

That is, according to some embodiments, referring to Equation 1, when a luminance value for each portion according to a position of the captured image data CID is greater than the preset threshold value TH, the constant B may have a value of 1, and when the luminance value for each portion according to the position of the captured image data CID is less than the preset threshold value TH, the constant B may have a value of 0. 1 means that the luminance value of the corresponding portion is reflected in the emission area, and 0 means that the luminance value of the corresponding portion is not reflected in the emission area. Accordingly, the pixel data generator 210 may identify the emission area of one pixel by reflecting a portion of the captured image data CID exceeding a minimum threshold value. Thereafter, referring together Equation 1, Equation 2, and Table 1, a final emission area of the corresponding pixel may be calculated by adding a value obtained by multiplying the luminance weight WF according to a portion of the captured image data CID by the constant B.

Accordingly, the pixel data generator 210 may calculate the emission area of one pixel. For example, when a luminance value of a first portion is less than a first threshold value TH1, a luminance weight WF of 0.5 may be applied, and when a luminance value of a second portion is greater than the first threshold value TH1, and less than a second threshold value TH2, a luminance weight WF of 1 may be applied. In addition, when a luminance value of a third portion is greater than the second threshold value TH2 and less than a third threshold value TH3, a luminance weight WF of 1.5 may be applied, and when a luminance value of a fourth portion is greater than the third threshold value TH3, a luminance weight WF of 2 may be applied. Here, as the luminance weight WF increases, it may be inferred that a corresponding portion is brighter than another portion.

According to some embodiments, the pixel data generator 210 calculates the emission area based on the captured image data CID of one pixel. However, one pixel may include a first sub-pixel emitting green light, a second sub-pixel emitting red light, and a third sub-pixel emitting blue light. Accordingly, the pixel data generator 210 may apply the luminance weight based on the captured image data CID for each sub-pixel and identify the emission area of each sub-pixel.

Referring to FIGS. 8A to 8C, a relationship of the current density according to the emission area of one pixel may be identified. Here, EPO may correspond to a value of 1/current density, and the emission area may be a value to which the luminance weight according to the position of the captured image CID described with reference to FIG. 7 is applied. For example, as the emission area increases, the current density may decrease. For example, FIG. 8A shows the EPO according to the emission area in the first sub-pixel (for example, a green pixel) of one pixel, FIG. 8B shows the EPO according to the emission area in the second sub-pixel (for example, a red pixel) of one pixel, and FIG. 8C shows the EPO according to the emission area in the third sub-pixel (for example, a blue pixel) of one pixel. $R^2$ shown in FIGS. 8A to 8C is a proportional constant of the EPO according to the emission area, is not limited to the shown number, and may be variously changed according to some embodiments.

That is, according to some embodiments, because the pixel data generator 210 calculates the emission area by reflecting the luminance weight WF in the captured image data CID of one pixel (or one sub-pixel), and calculates the current density data, accurate current density data according to the position and/or area of the light emitting element may be calculated. In addition, according to some embodiments, the pixel data generator 210 may predict the current density in consideration of the emission area, emission efficiency, and the like of sub-pixels of one pixel.

Hereinafter, a reason for including a stress data generator and a stress accumulator according to some embodiments is described with reference to FIG. 9.

Figure 9:
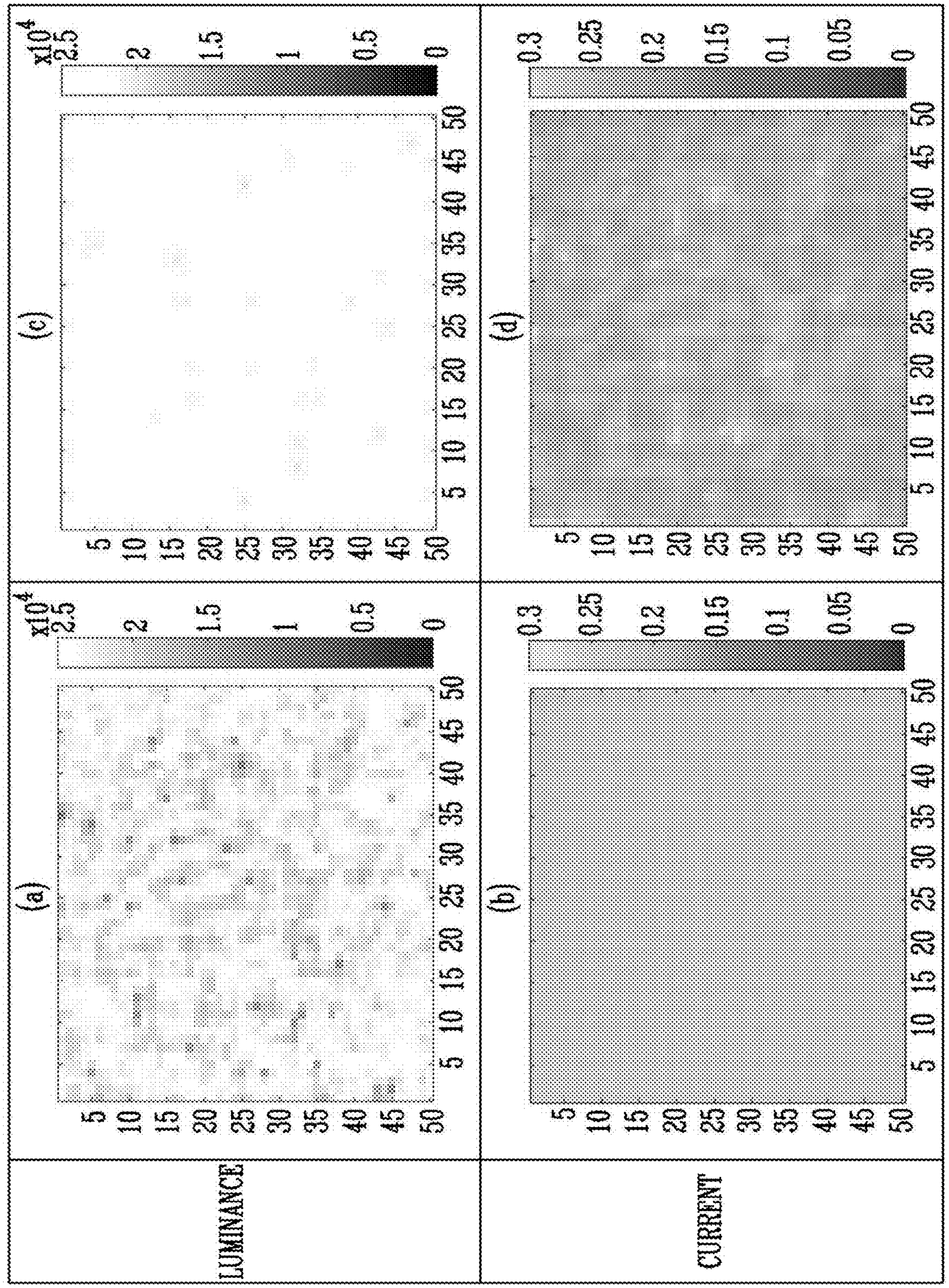
FIG. 9 is images illustrating a state of a display panel before and after driving of a pixel data generator according to some embodiments.

FIG. 9 is images illustrating a state of a display panel before and after driving of a pixel data generator according to some embodiments. Hereinafter, aspects of some embodiments of the present disclosure are described with reference to FIGS. 3 and 9 together.

Referring to FIGS. 9 and 3, (a) and (b) show luminance and current distribution images of the display panel before the pixel data generator 210 is driven. (c) and (d) show luminance and current distribution images of the display panel after the pixel data generator 210 is driven.

When the optical compensation is performed by driving the pixel data generator 210, the luminance of the display panel may be uniformly changed. Referring to (a) and (c), it may be checked that the luminance of the display panel is non-uniform in (a) and the luminance of the display panel is uniformly improved in (c).

On the other hand, when the pixel data generator 210 is driven and each of the pixels of the display panel is deteriorated, a stress current deviation may occur. (b) shows an image before the deterioration of each pixel occurs, and (d) shows an image after the deterioration of each pixel occurs. According to some embodiments, a configuration for improving the stress current deviation for each pixel may be required.

Therefore, according to some embodiments, after the pixel data generator 210 is driven, the stress data generator 220 and the stress accumulator 230 may be driven to generate the compensation data CDATA for compensating for the image data RGB. Thus, a stress accumulation error for each pixel may be efficiently improved.

Hereinafter, a configuration of an afterimage compensator according to some embodiments is described with reference to FIGS. 10 and 11.

Figure 10:
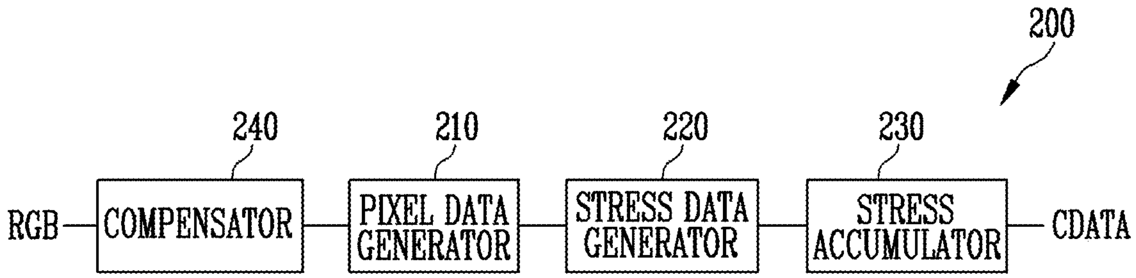
FIG. 10 is a diagram sequentially illustrating a part configuring an afterimage compensator according to some embodiments.
Figure 11:
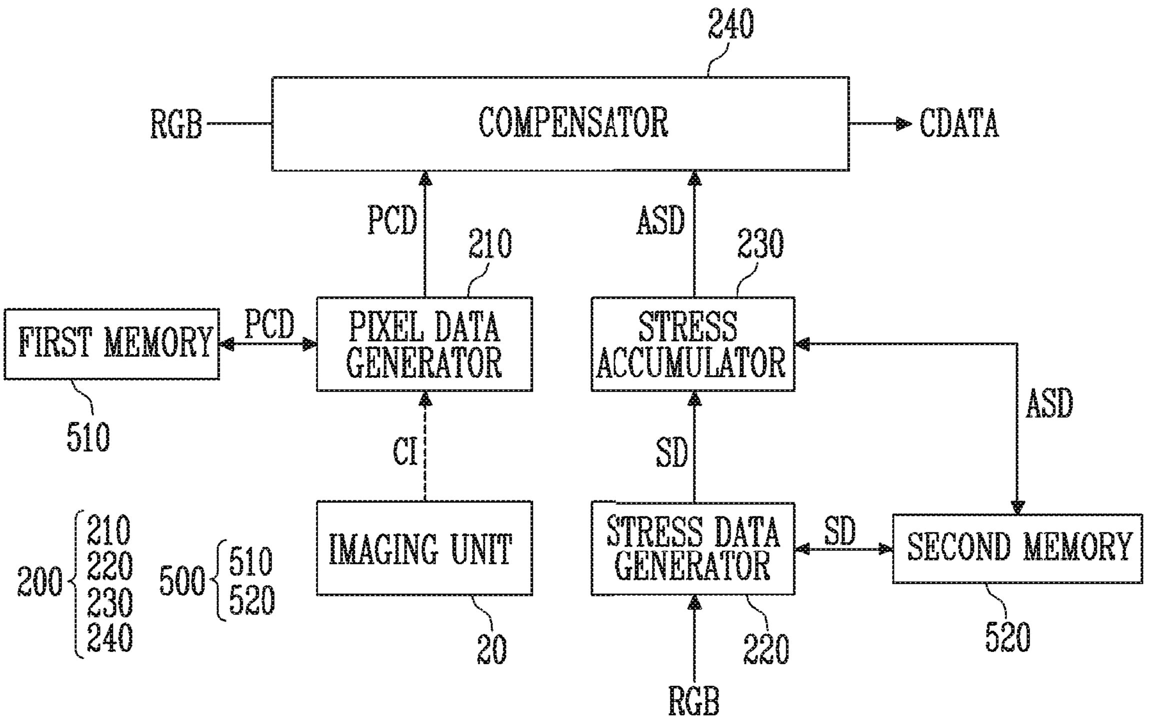
FIG. 11 is a block diagram illustrating an afterimage compensator according to some embodiments.

FIG. 10 is a diagram sequentially illustrating a part configuring an afterimage compensator according to some embodiments, and FIG. 11 is a block diagram illustrating an afterimage compensator according to some embodiments. Because FIG. 10 is similar to FIG. 2 described above, and FIG. 11 is similar to FIG. 3 described above, hereinafter, a difference is mainly described. The afterimage compensator 200 shown in FIGS. 10 and 11 may obtain and generate data in the grayscale domain.

The afterimage compensator 200 may include the pixel data generator 210, the stress data generator 220, the stress accumulator 230, and the compensator 240.

The pixel data generator 210 may generate the characteristic data for each pixel PCD corresponding to each of the pixels PX (or the sub-pixels), by using the captured image CI received from the imaging unit 20. The characteristic data for each pixel PCD may include the current density data for each pixel PX.

The stress data generator 220 may generate stress data SD corresponding to each of the pixels PX based on the image data RGB.

The stress accumulator 230 may accumulate the stress data SD to generate the accumulated stress data for each pixel ASD, and may provide the accumulated stress data for each pixel ASD to the compensator 240. At this time, the image data RGB, the characteristic data for each pixel PCD, the stress data SD, and the accumulated stress data for each pixel ASD may correspond to the grayscale domain.

According to some embodiments, the stress data generator 220 and the stress accumulator 230 may be positioned at a last stage of a configuration IP configuring the afterimage compensator 200. Because the stress data generator 220 and the stress accumulator 230 may generate the stress data SD and accumulate the stress data SD before the compensation data CDATA is output, the stress data of actual each pixel PX may be accurately reflected.

The compensator 240 may generate the compensation data CDATA based on the image data RGB by using the characteristic data for each pixel PCD and the accumulated stress data for each pixel ASD.

The memory 500 may include the first memory 510 for storing the characteristic data for each pixel PCD, and the second memory 520 for storing the stress data for each pixel SD and the accumulated stress data for each pixel ASD.

The pixel data generator 210 may store the characteristic data for each pixel PCD in the first memory 510, and the compensator 240 may directly read the characteristic data for each pixel PCD from the first memory 510.

The stress data generator 220 may store the stress data for each pixel SD in the second memory 520, and the stress accumulator 230 may store the accumulated stress data for each pixel ASD in the second memory 520. The compensator 240 may directly read the accumulated stress data for each pixel ASD from the second memory 520.

The afterimage compensator 200 according to some embodiments may generate the characteristic data for each pixel PCD and the accumulated stress data for each pixel ASD corresponding to each of the pixels PX, and may determine a deterioration amount of each of the pixels by using the characteristic data for each pixel PCD and the accumulated stress data for each pixel ASD.

Hereinafter, a method of compensating for image data of a display device according to some embodiments is described with reference to FIG. 12.

Figure 12:
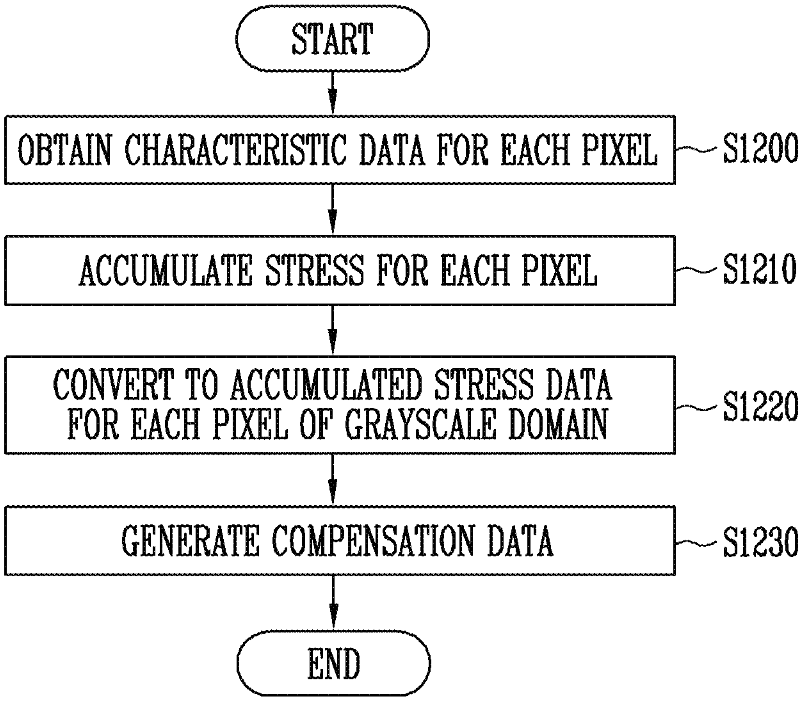
FIG. 12 is a flowchart illustrating a method of compensating for image data of a display device according to some embodiments.

FIG. 12 is a flowchart illustrating a method of compensating for image data of a display device according to some embodiments. Hereinafter, the disclosure is described with reference to FIGS. 1 to 11 together.

Referring to FIG. 12, the pixel data generator 210 may generate the characteristic data for each pixel corresponding to each of the pixels by using the captured image (S1200). Here, the characteristic data for each pixel may include the current density data corresponding to each of the pixels.

The pixel data generator 210 may calculate the current density data of each pixel PX by reflecting the luminance weight according to the area of each of the pixels and the position of the captured image CI based on the captured image CI captured from the external imaging unit 20.

The stress accumulator 230 may generate the stress Sv corresponding to each of the pixels PX based on the image signal RGBv of the voltage domain, and generate the accumulated stress for each pixel ASv by accumulating the stress Sv (S1210).

The domain converter 250 may convert the accumulated stress for each pixel ASv to the accumulated stress data for each pixel ASD of the grayscale domain (S1220).

The compensator 240 may generate the compensation data CDATA based on the image data RGBg of the grayscale domain by using the characteristic data for each pixel PCD and the accumulated stress data for each pixel ASD (S1230). Thereafter, the timing controller 360 may generate the compensation image data RGB' by applying the compensation data CDATA to the image data RGB, and the data driver 340 may provide the data signal corresponding to the compensation image data RGB' to the pixels PX.

Accordingly, the afterimage compensator 200 according to some embodiments may generate the characteristic data for each pixel PCD and the accumulated stress data for each pixel ASD corresponding to each of the pixels PX, and may determine a deterioration amount of each of the pixels by using the characteristic data for each pixel PCD and the accumulated stress data for each pixel ASD.

Hereinafter, a pixel according to some embodiments is described with reference to FIG. 13.

Figure 13:
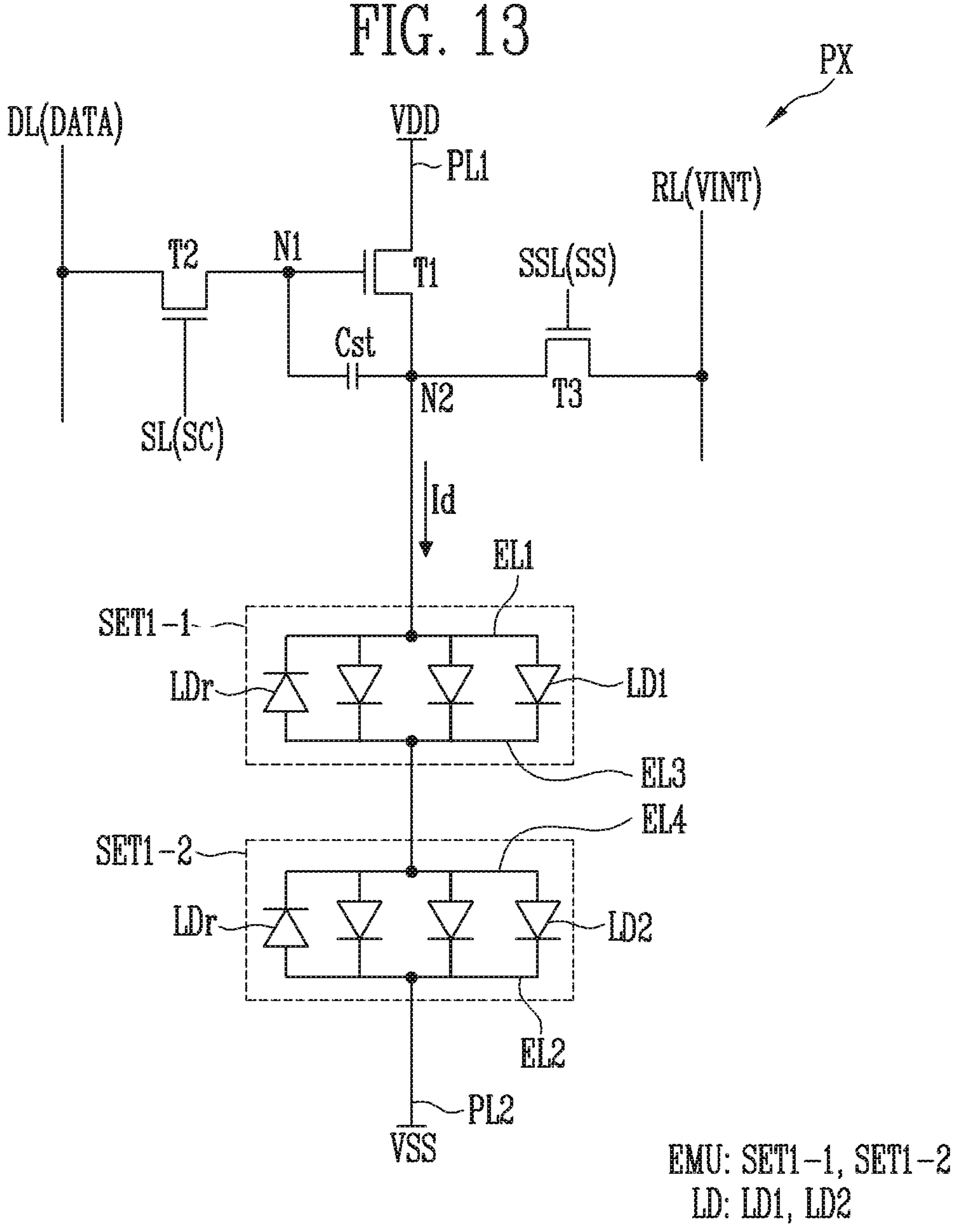
FIG. 13 is a circuit diagram illustrating an example of a pixel included in a display device according to some embodiments.

FIG. 13 is a circuit diagram illustrating an example of a pixel included in a display device according to some embodiments.

Referring to FIG. 13, the pixel PX may include a first transistor T1, a second transistor T2, a third transistor T3, a storage capacitor Cst, and a light emitting unit EMU.

A first electrode of the first transistor T1 (or a driving transistor) may be connected to a first power line PL1, and a second electrode may be connected to a first electrode EL1 (or a second node N2) of the light emitting unit EMU. A gate electrode of the first transistor T1 may be connected to a first node N1. According to some embodiments, the first electrode may be a drain electrode, and the second electrode may be a source electrode. The first transistor T1 may control a current amount of a driving current Id flowing to the light emitting unit EMU in response to a voltage of the first node N1.

A first electrode of the second transistor T2 (or a switching transistor) may be connected to a data line DL, and a second electrode may be connected to the first node N1 (or the gate electrode of the first transistor T1). A gate electrode of the second transistor T2 may be connected to a first scan line SL. The second transistor T2 may be turned on when a first scan signal SC (for example, a high level voltage) is supplied to the first scan line SL, to transmit a data voltage DATA from the data line DL to the first node N1.

A first electrode of the third transistor T3 may be connected to a sensing line RL, and a second electrode may be connected to the second node N2 (or the second electrode of the first transistor T1). A gate electrode of the third transistor T3 may be connected to a second scan line SSL. The third transistor T3 may be turned on when a second scan signal SS (for example, a high level voltage) is supplied to the second scan line SSL during a sensing period (e.g., a set or predetermined sensing period), to electrically connect a sensing line RL and the second node N2.

The storage capacitor Cst is connected between the first node N1 and the second node N2. The storage capacitor Cst may charge the data voltage DATA corresponding to the data signal supplied to the first node N1 during one frame. Accordingly, the storage capacitor Cst may store a voltage corresponding to a voltage difference between the first node N1 and the second node N2. For example, the storage capacitor Cst may store a voltage corresponding to a difference between the data voltage DATA supplied to the gate electrode of the first transistor T1 and an initialization voltage VINT supplied to the second electrode of the first transistor T1.

The light emitting unit EMU may include a plurality of light emitting elements LD connected in series and/or in parallel between the first power line PL1 to which the first driving voltage VDD is applied and the second power line PL2 to which the second driving voltage VSS is applied. Among the plurality of light emitting elements LD connected in parallel, each light emitting element LD connected in the same direction may configure an effective light source.

According to some embodiments, the light emitting element LD may be a bar-shaped light emitting diode manufactured in a bar shape. In the present specification, the term "bar shape" includes a rod-like shape or a bar-like shape elongated in a longitudinal direction (that is, an aspect ratio is greater than 1), such as a circular column or a polygonal column, and a shape of a cross-section thereof is not particularly limited. For example, a length of the light emitting element LD may be greater than a diameter (or a width of a cross-section) thereof. According to some embodiments, the light emitting element LD may have a size as small as a nano-scale to a micro-scale. Each of the light emitting elements LD may have a diameter and/or a length of a range from nano-scale to micro-scale. For example, the length of the light emitting element LD may be about 100 nm to 10 μm, the diameter of the light emitting element LD may be about 2 μm to 6 μm, and the aspect ratio of the light emitting element LD may range between about 1.2 to about 100. However, in the disclosure, the size of the light emitting element LD is not limited thereto.

The light emitting unit EMU may include a plurality of light emitting elements LD connected in series and/or in parallel between the first electrode EL1 connected to the second node N2 and the second electrode EL2 connected to the second power line PL2. Here, the first electrode EL1 may be an anode, and the second electrode EL2 may be a cathode. A third electrode EL3 may be a cathode, and a fourth electrode EL4 may be an anode.

The light emitting unit EMU may include a first sub-element group SET1-1 and a second sub-element group SET1-2 connected between the second node N2 and the second power line PL2. The first sub-element group SET1-1 may include at least one light emitting element LD1 connected between the first electrode EL1 and the third electrode EL3 in the same direction. The second sub-element group SET1-2 may include at least one light emitting element LD2 connected between the fourth electrode EL4 and the second electrode EL2 in the same direction. In addition, the first sub-element group SET1-1 may further include a reverse light emitting element LDr connected in an opposite direction between the first electrode EL1 and the third electrode EL3, and the second sub-element group SET1-2 may further include a reverse light emitting element LDr connected in an opposite direction between the fourth electrode EL4 and the second electrode EL2.

The light emitting unit EMU may generate light of a luminance (e.g., a set or predetermined luminance) in response to the driving current Id supplied from the first transistor T1. For example, during one frame period, the first transistor T1 may supply the driving current Id corresponding to a grayscale value to which a corresponding frame data (for example, the compensation image data RGB' to which the compensation data CDATA (refer to FIG. 1) is applied to the light emitting unit EMU. The driving current Id supplied to the light emitting unit EMU may be divided and flow to the light emitting elements LD (or element groups SET). Accordingly, while each light emitting element LD emits light with a luminance corresponding to the flowing current, the light emitting unit EMU (or the element group SET) may emit light of a luminance corresponding to the driving current Id.

In FIG. 13, the transistor is an NMOS, but the disclosure is not limited thereto. For example, at least one of the first to third transistors T1, T2, or T3 may be implemented as a PMOS.

Hereinafter, a pixel structure of a display device according to some embodiments is described with reference to FIG. 14.

Figure 14:
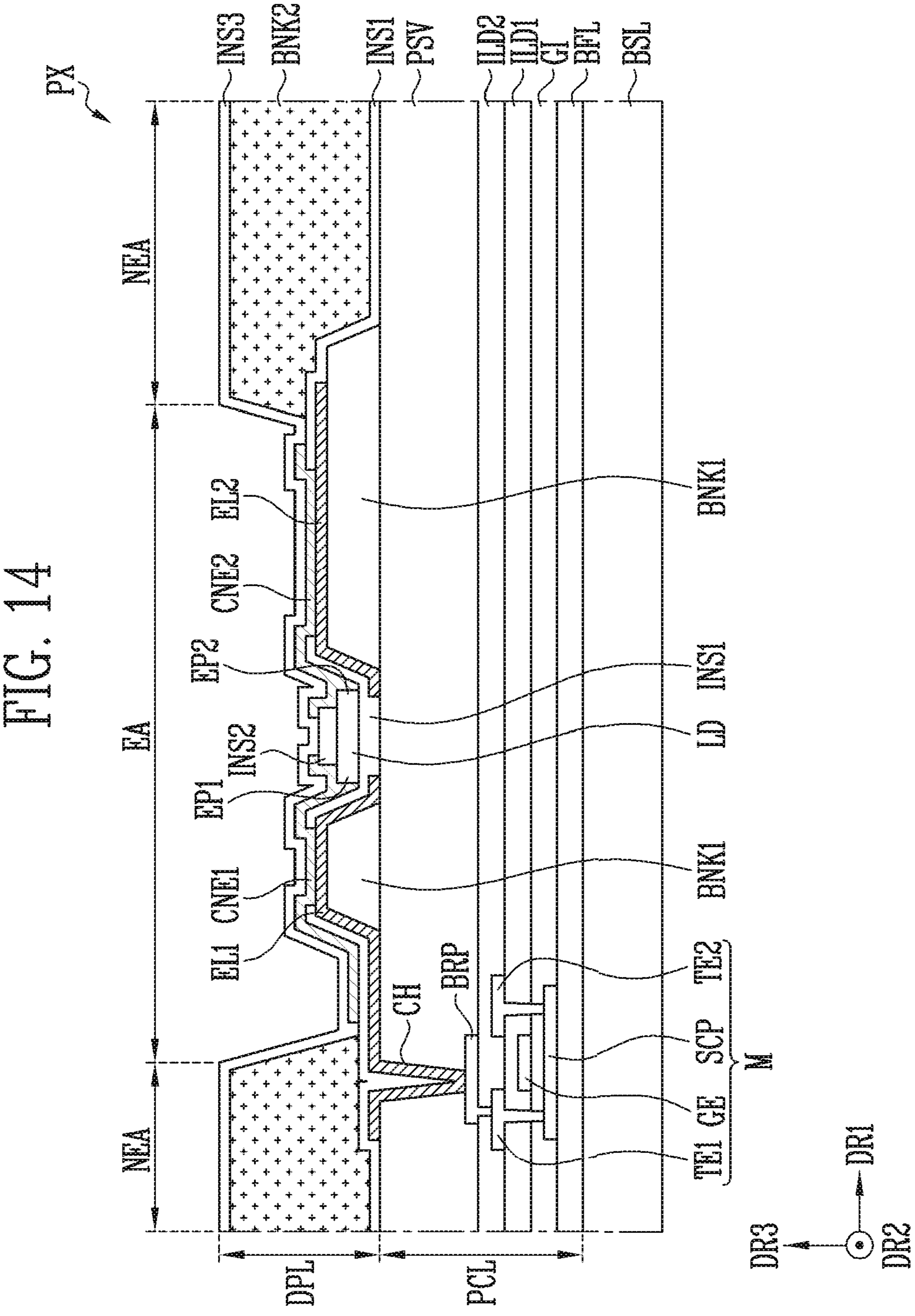
FIG. 14 is a cross-sectional view illustrating a pixel of a display device according to some embodiments.

FIG. 14 is a cross-sectional view illustrating a pixel of a display device according to some embodiments.

The pixel PX of the display device according to some embodiments may include a base layer BSL, and a pixel circuit layer PCL and a display element layer DPL positioned on one surface of the base layer BSL. According to some embodiments, a mutual position of the pixel circuit layer PCL and the display element layer DPL on the base layer BSL may vary.

The pixel circuit layer PCL may include at least one transistor, a storage capacitor, and a plurality of lines connected thereto. In addition, the pixel circuit layer PCL may include a buffer layer BFL, a gate insulating layer GI, a first interlayer insulating layer ILD1, a second interlayer insulating layer ILD2, and/or a passivation layer PSV sequentially stacked on one surface of the base layer BSL.

The buffer layer BFL positioned on the entire surface of the base layer BSL may include an inorganic insulating material. The buffer layer BFL may prevent an impurity from diffusing into a transistor, a capacitor, or the like.

A semiconductor layer is positioned on the buffer layer BFL. The semiconductor layer may include a semiconductor pattern SCP of a transistor M. The semiconductor pattern SCP may include a channel region overlapping a first gate electrode GE, which will be described later, and a source region and a drain region located on both sides of the channel region. The semiconductor pattern SCP may be formed of polycrystalline silicon, amorphous silicon, an oxide semiconductor, or the like.

The gate insulating layer GI is positioned on the semiconductor layer. According to some embodiments, the gate insulating layer GI may be positioned to cover at least a portion of the semiconductor layer. Accordingly, the gate insulating layer GI may be positioned in a middle portion of the semiconductor layer so that both ends of the semiconductor layer are exposed.

The gate insulating layer GI may include an inorganic material including silicon oxide (SiOx), silicon nitride (SiNx), silicon oxynitride (SiOxNy), or the like. However, the disclosure is not limited thereto, and according to some embodiments, the gate insulating layer GI may be an organic insulating layer including an organic material.

A gate conductor is positioned on the gate insulating layer GI. The gate conductor includes the first gate electrode GE. The first gate electrode GE may be positioned to overlap the channel region of the first semiconductor pattern SCP. The gate conductor may include a gate electrode of each transistor among a plurality of transistors included in the pixel circuit layer PCL, one electrode of the storage capacitor, a gate line, and the like.

The first interlayer insulating layer ILD1 is positioned on the gate conductor. The first interlayer insulating layer ILD1 may include the same material as the gate insulating layer GI or at least one of the materials exemplified in the gate insulating layer GI. For example, the first interlayer insulating layer ILD1 may be an inorganic insulating layer including an inorganic material.

A first data conductor is positioned on the first interlayer insulating layer ILD1. The first data conductor includes a first electrode TE1 and a second electrode TE2 of the transistor M. The first electrode TE1 may be a drain electrode connected to the drain region of the first semiconductor pattern SCP, and the second electrode TE2 may be a source electrode connected to the source region of the first semiconductor pattern SCP. In addition, the first electrode TE1 may be a source electrode of the transistor M, and the second electrode TE2 may be a drain electrode. The first data conductor may include the first electrode TE1 and the second electrode TE2 of each transistor M among the plurality of transistors, and may include another electrode of the storage capacitor, a data line, and the like.

The second interlayer insulating layer ILD2 is positioned on the first data conductor. The second interlayer insulating layer ILD2 may include at least one of silicon oxide (SiOx), silicon nitride (SiNx), or silicon oxynitride (SiOxNy). According to some embodiments, the second interlayer insulating layer ILD2 may be an organic insulating layer including an organic material.

A second data conductor is positioned on the second interlayer insulating layer ILD2. The second data conductor includes a bridge pattern BRP connecting the pixel circuit layer PCL and the display element layer DPL. The second data conductor may further include a driving voltage line, a driving low voltage line, and the like. The bridge pattern BRP may be connected to the first electrode EL1 of the light emitting element LD of each pixel PX through a contact hole CH. For example, the light emitting element LD may be an organic light emitting diode or at least one ultra-small inorganic light emitting diode. For convenience, in the following description, the light emitting element LD has been described as an ultra-small inorganic light emitting diode.

The passivation layer PSV is positioned on the second data conductor. The passivation layer PSV may include at least one organic insulating layer and may substantially planarize a surface of the pixel circuit layer PCL. The passivation layer PSV may be formed of a single layer or multiple layers, and may include an inorganic insulating material or an organic insulating material. For example, the passivation layer PSV may include at least one of acrylic resin (polyacrylates resin), epoxy resin, phenolic resin, polyamides resin, or polyimide resin.

The display element layer DPL is positioned on the pixel circuit layer PCL including the passivation layer PSV. The contact hole CH of the passivation layer PSV may connect the bridge pattern BRP of the pixel circuit layer PCL and the first electrode EL1 of the display element layer DPL.

The display element layer DPL includes the light emitting element LD of the pixels PX and electrodes connected to the light emitting element LD. The light emitting element LD may be an ultra-small inorganic light emitting diode as small as a nano-scale to a micro-scale formed by growing a nitride-based semiconductor.

The display element layer DPL includes a first bank BNK1, a second bank BNK2, the first electrode EL1, the second electrode EL2, a first insulating layer INS1, a second insulating layer INS2, a first contact electrode CNE1, a second contact electrode CNE2, and a third insulating layer INS3.

The first bank BNK1 is positioned on the passivation layer PSV. The first bank BNK1 may be positioned in an area from which light is emitted from each pixel PX (for example, the emission area EA). The first bank BNK1 may be located under a portion of the first electrode EL1 and the second electrode EL2 so as to guide light emitted from the light emitting element LD in an image display direction of the display panel (for example, an upper direction of each pixel PX, and a third direction DR3), and may protrude a portion of the first electrode EL1 and the second electrode EL2 in the upper direction, that is, the third direction DR3. The first bank BNK1 may include an inorganic insulating layer formed of an inorganic material or an organic insulating layer formed of an organic material. According to some embodiments, the first bank BNK1 may include a single organic insulating layer or a single inorganic insulating layer, but is not limited thereto.

The second bank BNK2 is positioned on the first insulating layer INS1. The second bank BNK2 may be a structure that divides the emission area EA of each of the pixels PX, and may be positioned in a non-emission area NEA of each pixel PX or the non-emission area NEA between the pixels PX so as to surround the emission area EA of each pixel PX. For example, the second bank BNK2 may be a pixel defining layer or a dam structure. The second bank BNK2 may be configured to include at least one light blocking material and a reflective material.

Each of the first electrode EL1 and the second electrode EL2 is positioned on the first bank BNK1 and have a surface corresponding to a shape of the first bank BNK1. The first electrode EL1 and the second electrode EL2 may include a material having a uniform reflectance. Accordingly, the light emitted from the light emitting element LD may proceed in the image display direction (the third direction DR3) of the display panel by the first electrode EL1 and the second electrode EL2.

The first electrode EL1 may be electrically connected to the first electrode TE1 of the transistor M through the contact hole CH passing through the passivation layer PSV. The second electrode EL2 may be connected to driving power through at least one contact hole passing through the passivation layer PSV.

According to some embodiments, the first electrode EL1 may be an anode, and the second electrode EL2 may be a cathode.

The first insulating layer INS1 is positioned between each of the first electrode EU and the second electrode EL2 and the passivation layer PSV. The first insulating layer INS1 may fill a space between the light emitting element LD and the passivation layer PSV to stably support the light emitting element LD. The first insulating layer INS1 may include at least one of an inorganic insulating layer or an organic insulating layer, and may be formed of a single layer or multiple layers.

The light emitting element LD is positioned on the first insulating layer INS1. At least one light emitting element LD may be located between the first electrode EL1 and the second electrode EL2. According to some embodiments, a plurality of light emitting elements LD may be located between the first electrode EU and the second electrode EL2, and the plurality of light emitting elements LD may be connected to each other in parallel.

The second insulating layer INS2 is positioned on a portion of the light emitting element LD. The second insulating layer INS2 may cover a portion of an upper surface of each of the light emitting elements LD and expose a first end EP1 and a second end EP2 of the light emitting element LD. The second insulating layer INS2 may stably fix the light emitting element LD. When an empty space exists between the first insulation layer INS1 and the light emitting element LD before the second insulation layer INS2 is formed, the empty space may be at least partially filled by the second insulation layer INS2.

On the first electrode EL1, the first contact electrode CNE1 electrically and physically connecting the first electrode EL1 and one end (for example, the first end EP1) of the both ends of the light emitting element LD is positioned. The first contact electrode CNE1 may be positioned to overlap a portion of the first insulating layer INS1, the second insulating layer INS2, and the light emitting element LD. The first insulating layer INS1 may be removed from a portion where the first electrode EL1 and the first contact electrode CNE1 are connected, that is, a portion where the first electrode EL1 and the first contact electrode CNE1 directly contact each other.

On the second electrode EL2, the second contact electrode CNE2 electrically and physically connecting the second electrode EL2 and one end (for example, the second end EP2) of the both ends of the light emitting element LD is positioned. The second contact electrode CNE2 may be positioned to overlap a portion of the first insulating layer INS1, the second insulating layer INS2, and the light emitting element LD. The first insulating layer INS1 may be removed from a portion where the second electrode EL2 and the second contact electrode CNE2 are connected, that is, a portion where the second electrode EL2 and the second contact electrode CNE2 directly contact each other.

The first contact electrode CNE1 and the second contact electrode CNE2 may be formed of a transparent conductive material. For example, the first contact electrode CNE1 and the second contact electrode CNE2 may include a material such as indium tin oxide (ITO), indium zinc oxide (IZO), or indium tin zinc oxide (ITZO). Accordingly, the light emitted from the light emitting element LD and reflected by the first electrode EL1 and the second electrode EL2 may proceed in the image display direction (the third direction DR3) of the display panel.

The third insulating layer INS3 is positioned on the first contact electrode CNE1, the second contact electrode CNE2, and the second bank BNK2. The third insulating layer INS3 may include at least one organic layer or inorganic layer, and may be entirely positioned to cover a surface of the display element layer DPL.

Although aspects of some embodiments of the present disclosure have been described with reference to the embodiments described above, those skilled in the art or those having a common knowledge in the art will understand that the disclosure may be variously modified and changed without departing from the spirit and technical area of the disclosure described in the claims and their equivalents, which will be described later.

Therefore, the technical scope of embodiments according to the present disclosure are not limited to the contents described in the detailed description of the specification, and embodiments according to the present disclosure are defined by the following claims, and their equivalents.

What is claimed is:

1. An afterimage compensator comprising:

a pixel data generator configured to generate characteristic data for one or more pixels from among a plurality of pixels by using a captured image, wherein the characteristic data includes a deterioration information for one or more pixels;

a stress accumulator configured to generate an accumulated stress for the one or more pixels from among the plurality of pixels in which stress corresponding to the one or more pixels is accumulated based on an image signal of a voltage domain, wherein the plurality of pixels include light emitting elements;

a domain converter configured to convert the accumulated stress for the one or more pixels from the voltage domain to accumulated stress data for the one or more pixels of a grayscale domain, wherein the stress data includes at least one information among an emission time, a grayscale, a luminance, and a temperature; and a compensator configured to generate compensation data using the characteristic data for the one or more pixels and the accumulated stress data for the one or more pixels, wherein stress accumulator accumulates the stress before the compensation data is output, and wherein the afterimage compensator is implemented as one of an application processor and an integrated circuit.

2. The afterimage compensator according to claim 1, wherein the characteristic data for the one or more pixels further includes current density data corresponding to the one or more pixels.

3. The afterimage compensator according to claim 2, wherein the captured image includes information on a number of light emitting elements for the one or more pixels.

4. The afterimage compensator according to claim 3, wherein the pixel data generator is configured to process the captured image to generate captured image data, to calculate an emission area of the one or more pixels by reflecting a luminance weight in the captured image data, and to calculate the current density data corresponding to the one or more pixels.

5. The afterimage compensator according to claim 4, wherein the domain converter is configured to provide the accumulated stress data for the one or more pixels corresponding to the grayscale domain to the compensator.

6. A display device comprising:

a display panel including pixels; and an afterimage compensator configured to generate characteristic data for one or more pixels from among a plurality of pixels based on a captured image, to generate an accumulated stress for the one or more pixels from among the plurality of pixels by accumulating an image signal of a voltage domain, to convert the accumulated stress for the one or more pixels to accumulated stress data for the one or more pixels of a grayscale domain, and to output compensation data based on the characteristic data for the one or more pixels and the accumulated stress data for the one or more pixels, wherein the characteristic data includes a deterioration information for one or more pixels, wherein the stress data includes at least one information among an emission time, a grayscale, a luminance, and a temperature, wherein the plurality of pixels include light emitting elements, and wherein the afterimage compensator is implemented as one of an application processor and an integrated circuit.

7. The display device according to claim 6, wherein the characteristic data for the one or more pixels further includes current density data corresponding to the one or more pixels.

8. The display device according to claim 7, wherein the captured image includes information on a number of light emitting elements for the one or more pixels.

9. The display device according to claim 8, wherein the afterimage compensator is configured to process the captured image to generate captured image data, to calculate an emission area of the one or more pixels by reflecting a luminance weight in the captured image data, and to calculate the current density data corresponding to the one or more pixels.

10. The display device according to claim 9, further comprising:

a first memory configured to store the characteristic data for the one or more pixels.

11. The display device according to claim 10, further comprising:

a second memory configured to store the accumulated stress for the one or more pixels.

12. The display device according to claim 6, further comprising:

a scan driver configured to provide a scan signal to the one or more pixels.

13. The display device according to claim 6, further comprising:

a data driver configured to provide a data signal to which the compensation data is applied to the one or more pixels.

14. The display device according to claim 13, further comprising:

a timing controller configured to provide image data to the afterimage compensator.

15. The display device according to claim 6, wherein each of the one or more pixels includes light emitting elements of a column shape.

16. A method of compensating for image data of a display device, the method comprising:

generating characteristic data for one or more pixels from among a plurality of pixels by using a captured image, wherein the characteristic data includes a deterioration information for one or more pixels;

generating a stress corresponding to the one or more pixels based on an image signal of a voltage domain, and generating an accumulated stress for the one or more pixels by accumulating the stress;

converting the accumulated stress for the one or more pixels to accumulated stress data for the one or more pixels of a grayscale domain, wherein the stress data includes at least one information among an emission time, a grayscale, a luminance, and a temperature; and generating compensation data using the characteristic data for the one or more pixels and the accumulated stress data for the one or more pixels, wherein the plurality of pixels include light emitting elements.

17. The method according to claim 16, wherein the characteristic data for the one or more pixels includes current density data corresponding to the one or more pixels.

18. The method according to claim 17, wherein the captured image includes information on a number of light emitting elements for the one or more pixels.

19. The method according to claim 18, wherein captured image data is generated by processing the captured image, an emission area of the one or more pixels is calculated by reflecting a luminance weight in the captured image data, and the characteristic data for the one or more pixels is generated by calculating the current density data corresponding to the one or more pixels.

20. The method according to claim 19, wherein compensation image data is generated by applying the compensation data to image data, and a data signal corresponding to the compensation image data is provided to the one or more pixels.

* * * * *